W. H. SHINDOLL.
ANIMAL CATCHER.
APPLICATION FILED SEPT. 11, 1912.

1,054,044.

Patented Feb. 25, 1913.

2 SHEETS—SHEET 1.

Witnesses
Geo. Knutson
E. C. Skinkle

Inventor:
William H. Shindoll
By his Attorneys;
Williamson Merchant

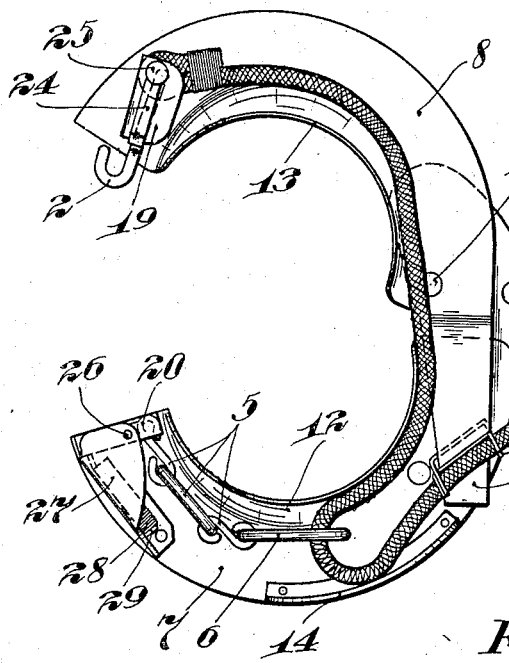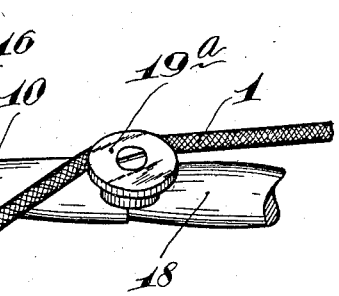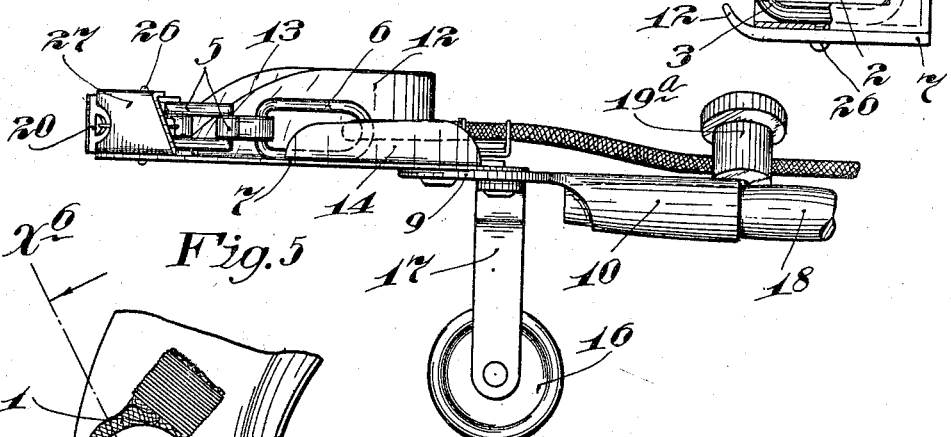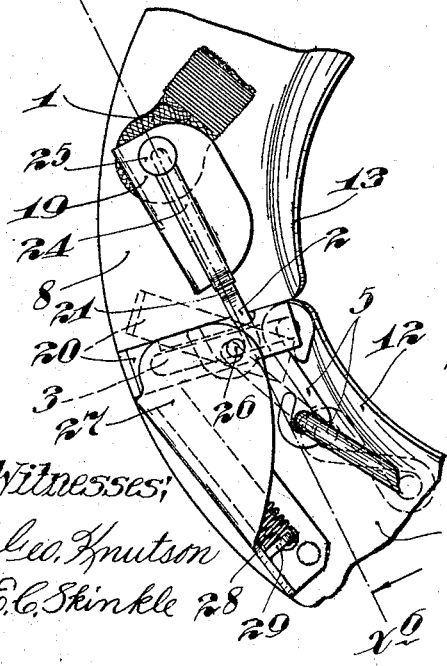

UNITED STATES PATENT OFFICE.

WILLIAM H. SHINDOLL, OF ARLINGTON, SOUTH DAKOTA.

ANIMAL-CATCHER.

1,054,044.   Specification of Letters Patent.   Patented Feb. 25, 1913.

Application filed September 11, 1912. Serial No. 719,757.

*To all whom it may concern:*

Be it known that I, WILLIAM H. SHINDOLL, a citizen of the United States, residing at Arlington, in the county of Kingsbury and State of South Dakota, have invented certain new and useful Improvements in Animal-Catchers; and I do hereby declare the following to be a full, clear, and exact description of the invention, such as will enable others skilled in the art to which it appertains to make and use the same.

My invention has for its object to provide an improved animal catcher, especially adapted for use in catching hogs or other animals by the legs, and, to this end, it consists of the novel devices and combinations of devices hereinafter described and defined in the claims.

The invention is illustrated in the accompanying drawings, wherein like characters indicate like parts throughout the several views.

Figure 1:
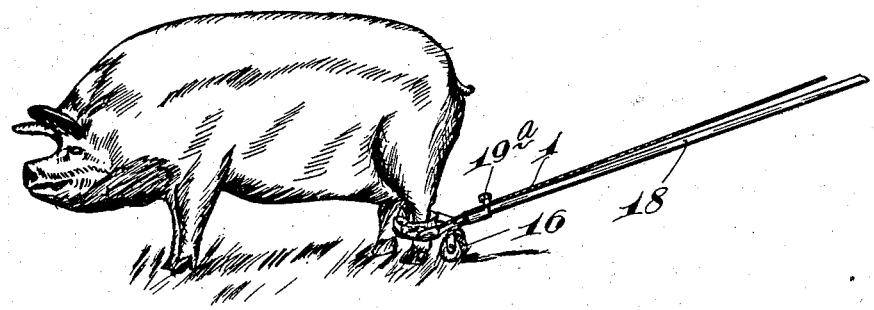
Figure 8:
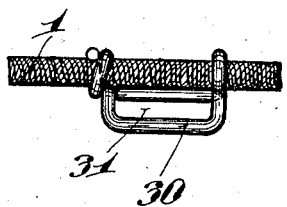
Figure 2:
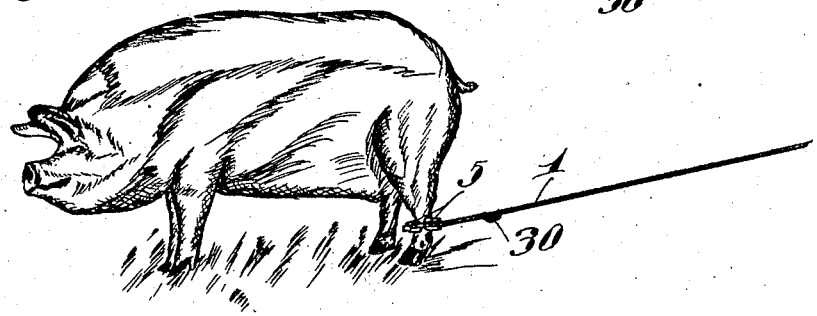

Referring to the drawings: Figure 1 is a view of the improved catcher, set in a position to apply the slip loop of the lasso around the hog's hind leg; Fig. 2 is a view of the improved lasso, secured to the hog's leg, the device for applying the lasso being removed; Fig. 3 is a plan view of the slip loop end of the lasso and the device used in applying the same around the leg of an animal, said parts being in their open or set positions, some parts being broken away; Fig. 4 is a view in side elevation of the parts shown in Fig. 3; Fig. 5 is a detail view in plan, on an enlarged scale, of some of the parts shown in Fig. 3, said parts being moved into different positions from those shown in Fig. 3; Fig. 6 is a section, taken on the line $x^6$ $x^6$ of Fig. 5; Fig. 7 is a transverse section taken on the line $x^7$ $x^7$ of Fig. 6, some parts being broken away; and Fig. 8 is a detail view of a releasable keeper, and a portion of the lasso to which it is secured.

The improved lasso, which, as shown, is in the form of a rope or cable, has interposed in its slip loop a separable coupling comprising a pair of interlocking members 2 and 3. The coupling member 2 is in the form of a comparatively wide hook, having cut or punched in its shank an elongated eye 4, to which is permanently secured the free end of the slip loop of the lasso 1. The coupling member 3 is in the form of a link, adapted to receive and hold the hook 2, and is connected, by intermediate links 5, to a comparatively large link 6, through which the slip loop portion of the lasso 1 is passed, and slidably works.

For applying the slip loop of the lasso 1 around the leg of an animal, is provided a pair of coöperating grapple jaws 7 and 8, mounted on a flat head piece 9, having a receiving socket 10. The inner end portion of the grapple jaw 7 is secured by rivets or otherwise to the head piece 9, and the inner end portion of the grapple jaw 8 is secured at its inner end portion to the head piece 9 by a pivot pin 11, for swinging movement toward and from the grapple jaw 7. As shown, the grapple jaws 7 and 8 are preferably cut or punched from sheet metal, and their inner edge portions are bent or turned inwardly and upwardly to form, respectively, retaining flanges 12 and 13. Laterally spaced from the flange 12, and rigidly secured to the outer edge portion of the fixed grapple jaw 8, is an upwardly projecting retaining flange 14. These retaining flanges 12, 13 and 14 coöperate to keep the slip loop of the lasso 1 properly positioned on the grapple jaws 7 and 8. By reference to Fig. 4, it will be noted that the retaining flanges 12 and 13 taper in both directions from their intermediate portions to the grapple jaws 7 and 8, thereby facilitating the releasing of the slip loop of the lasso 1 therefrom.

An arm extension 15 is integrally formed with the pivot end of the movable grapple jaw 8 and works slightly above the inner end of the fixed grapple jaw 7. This arm extension 15 is flat, and extends in a horizontal direction, and its edges are tapered toward the free end of the arm 15, the purpose of which will presently appear.

The grapple jaws 7 and 8 are supported in a slightly elevated position above the ground by a ground-engaging wheel 16, journaled to a depending bifurcated bracket 17, secured to the under face of the head 9. For moving the wheel 16 over the ground, one end of a long push pole 18 is secured within the socket 10 of the head 9. A guide sheave 19ª for the lasso 1 is secured to the push pole 18 at a point adjacent to the socket 10.

For releasably holding the coupling members 2 and 3 on the grapple jaws 7 and 8, and in positions for interlocking engagement with each other, at the time the grapple jaws 7 and 8 are closed, a pair of keepers 19 and 20 are secured, respectively, to the grapple jaws 8 and 7. The keeper 19 is in the form of a channel piece, rigidly secured to the upper face and near the free end portion of the movable grapple jaw 8, with its side flanges turned horizontally toward the pivot pin 11. The distance between the side flanges of the keeper 19 is such as to permit the shank of the hook 2 to be projected edgewise therebetween, and to be moved laterally therefrom, as best shown in Fig. 6.

To prevent the shank of the hook 2 from being pulled backward through the keeper 19, and also to hold the same in an upright position, said shank is provided at its edges with a pair of reversely projecting guide lugs 21. These guide lugs 21 are seated in a pair of guide notches 22, cut in the front edge portions of the side flanges of the keeper 19. Also cut in the vertical web of the keeper 19 is a notch 23, as shown in Fig. 6, which permits free movement of the lasso 1 at a point where the same is connected to the shank of the hook 2. A leaf spring 24 is secured at 25 to the top side flange of the keeper 19, and its free end is bent so as to engage the upper lug 21, as best shown in Fig. 6, thereby yieldingly holding the shank of the hook 2 in the keeper 19.

As best shown in Figs. 6 and 7, the keeper 20 is in the form of a yoke, constructed from a channel piece of metal, the flanges of which are turned inward. The prongs of the yoke-like keeper 20 project horizontally, and they are intermediately pivoted at 26 to the grapple jaw 7 and the overlying flange of the channel-shaped bracket 27, secured to the grapple jaw 7, to permit horizontal swinging movement of the keeper 20. The yoke-like keeper 20 is of such size as to permit the link 3 to be projected endwise therein, as best shown in Figs. 6 and 7. Obviously, the side flanges of the yoke-like keeper 20 hold the link 3 against lateral movement therefrom.

The yoke-like keeper 20 is yieldingly held by a coiled spring 28 in a normally set position, transversely of the hook 2, and in a position to permit said hook 2 to be projected through the link 3 at its free end, when the grapple jaws 7 and 8 are closed, as best shown in Figs. 6 and 7. The spring 28 is anchored at one end to a lug 29 on the vertical web of the bracket 27, and its other end is anchored to the vertical or transverse portion of the yoke-like keeper 20. When in a normal position, the transverse portion of the yoke-like keeper 20 is yieldingly held against the edge portion of the vertical web of the bracket 27, which acts as a stop to limit the swinging movement of the yoke-like keeper 20.

When the grapple jaws 7 and 8 are in their set or open positions, the loop end of the lasso 1 rests loosely thereon and is held in its proper position by the retaining flanges 12 and 13. At a point where the link 6 embraces the lasso 1, said lasso is bent upon itself and held in this position by the retaining flanges 12 and 14, as shown in Fig. 3. From its slip loop the lasso 1 extends over the guide sheave 19, and from thence to the rear end of the push pole or handle 18. For closing the grapple jaw 8 onto the grapple jaw 7, the lasso 1 is releasably connected to the arm extension 15 by a keeper 30, permanently secured to the lasso 1, at a point between the slip loop thereof and a point where the same passes over the guide sheave 19. This keeper 30, as shown, is preferably formed from a single piece of wire, bent to form a rectangular opening 31, adapted to be telescoped onto the free end of the arm extension 15, and frictionally held by the tapered edges thereof.

The operation of the improved animal catcher may be briefly stated as follows: The coupling members 2 and 3 are first placed in their keepers 19 and 20 and the grapple jaw 8 moved into an open position, next the keeper 30 is forced onto the arm extension 15, the slip loop of the lasso 1 properly positioned, as shown in Fig. 3, and with the intermediate portion of the lasso 1 passed over the guide sheave 19. After the improved animal catcher is properly set, the free end of the push pole 18 is held in one of the operator's hands and the free end of the lasso 1 is held in his other hand. The wheel supported grapple jaws 7 and 8 are then moved forward toward the animal, which is desired to be caught, until they are in a position to embrace one of the animal's legs. As soon as the grapple jaws 7 and 8 are properly positioned, the operator pulls on the lasso 1, thereby moving the movable grapple jaw 8 into a closed position, with the hook 2 projected through the link 3. By a continued pull on the lasso 1, after the grapple jaw 8 has been closed, the keeper 30 is pulled from the arm extension 13 and the slip loop of the lasso 1 is drawn against the retaining flanges 12 and 13. As the guide lugs 21 securely hold the hook 2 against backward movement in the keeper 19, the pulling strain on the lasso 1 will come on the link 3. This pulling strain on the link 3 will swing the keeper 20 on its pivotal connections 25 against the tension of the spring 28, and into a position that is substantially alined with the shank of the hook 2. The swinging movement of the keeper 20 will bring the free end portion of the link 3 back of the hook 2. By a continued pull on the lasso 1, the link 3 is moved endwise out of its keeper 20, at the same time interlocking the coupling elements. The hook 2 at this time is also released from the keeper 19 against the tension of the spring 24. The slip loop of the lasso 1 is now free from the grapple jaws 7 and 8, and secured about the animal's leg.

The above described device, while extremely simple and of comparatively small cost to manufacture, has, in actual practice, been found highly efficient for the purpose had in view.

What I claim is:

1. The combination with a lasso having a separable coupling interposed in its slip loop, of means for releasably supporting the slip loop of said lasso in an open position, and means operative to close said slip loop and to couple together the elements of said separable coupling.

2. The combination with a lasso having a separable coupling interposed in its slip loop, of means for releasably supporting the slip loop of said lasso in an open position, said means operative, under a pulling action on said lasso, to close said slip loop, to couple together the elements of said separable coupling, and to release said slip loop from its supporting means.

3. The combination with a lasso having a separable coupling interposed in its slip loop, of a handle having a pair of coöperating grapple jaws, means for releasably supporting the slip loop of said lasso in an open position over said grapple jaws, and means operative, under a pulling action on said lasso, to close said grapple jaws and thereby couple together the elements of said separable coupling, and to release said slip loop from said grapple jaws.

4. The combination with a lasso having a separable coupling interposed in its slip loop, of a handle having a pair of grapple jaws, one of which is fixed and the other of which is movably mounted, an operating arm on said movable grapple jaw, keepers on said grapple jaws for releasably holding the elements of said separable coupling in position, for interlocking engagement, and a keeper for releasably connecting said lasso to the arm of said movable grapple jaw.

5. The combination with a lasso having a separable coupling interposed in the slip loop, of a handle having a pair of grapple jaws, one of which is fixed and the other of which is pivotally mounted, an operating arm on said movable grapple jaw, a fixed keeper in said movable jaw, and a movable keeper on said fixed jaw, for releasably holding the elements of said separable coupling in position for interlocking engagement, a keeper for releasably connecting said lasso to the arm of said movable grapple jaw, and retaining flanges on said grapple jaw for holding the slip loop of said lasso thereon.

In testimony whereof I affix my signature in presence of two witnesses.

WILLIAM H. SHINDOLL.

Witnesses:
L. S. MADSON,
A. W. CARLSON.